United States Patent
Haustein et al.

(10) Patent No.: US 7,340,646 B2
(45) Date of Patent: Mar. 4, 2008

(54) APPARATUS, SYSTEM, AND METHOD FOR RESOURCE GROUP BACKUP

(75) Inventors: Nils Haustein, Zornheim (DE); Stefan Lehmann, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 10/837,730

(22) Filed: May 3, 2004

(65) Prior Publication Data

US 2005/0257085 A1    Nov. 17, 2005

(51) Int. Cl.
*G06F 11/00*    (2006.01)

(52) U.S. Cl. .............................. 714/20; 714/57; 714/6; 707/202; 718/103

(58) Field of Classification Search .................. 714/20, 714/57
See application file for complete search history.

(56) References Cited

U.S. PATENT DOCUMENTS

| | | | | |
|---|---|---|---|---|
| 4,916,605 | A | 4/1990 | Beardsley et al. | 364/200 |
| 5,713,024 | A | 1/1998 | Halladay | 395/712 |
| 5,717,614 | A * | 2/1998 | Shah et al. | 702/119 |
| 5,874,951 | A * | 2/1999 | Sakakibara et al. | 715/500.1 |
| 5,924,102 | A | 7/1999 | Perks | 707/200 |
| 6,157,931 | A | 12/2000 | Cane et al. | 707/204 |
| 6,199,170 | B1 * | 3/2001 | Dietrich | 713/400 |
| 6,385,707 | B1 | 5/2002 | Maffezzoni | 711/162 |
| 6,598,179 | B1 * | 7/2003 | Chirashnya et al. | 714/37 |
| 6,748,550 | B2 * | 6/2004 | McBrearty et al. | 714/4 |
| 6,918,059 | B1 * | 7/2005 | Galuten et al. | 714/31 |
| 6,948,038 | B2 * | 9/2005 | Berkowitz et al. | 711/162 |
| 7,043,665 | B2 * | 5/2006 | Kern et al. | 714/5 |
| 7,117,213 | B2 * | 10/2006 | McDermott et al. | 707/10 |
| 7,194,681 | B1 * | 3/2007 | Horvitz | 715/514 |
| 2004/0078397 | A1 * | 4/2004 | Mehta et al. | 707/202 |
| 2004/0078724 | A1 * | 4/2004 | Keller et al. | 714/48 |
| 2004/0148389 | A1 * | 7/2004 | Satomi et al. | 709/224 |
| 2004/0236852 | A1 * | 11/2004 | Birkestrand et al. | 709/226 |
| 2005/0222811 | A1 * | 10/2005 | Jakobson et al. | 702/183 |
| 2005/0223283 | A1 * | 10/2005 | Frey et al. | 714/20 |
| 2005/0289404 | A1 * | 12/2005 | Maguire | 714/57 |
| 2006/0156077 | A1 * | 7/2006 | Altaf et al. | 714/57 |
| 2006/0265746 | A1 * | 11/2006 | Farley et al. | 726/22 |

OTHER PUBLICATIONS http://www.winnetmag/Windows/ArticleID/8485/8485.html -Norian, Michael, "XactCopy" Windows & .NET Magazine, May 2000.

* cited by examiner

*Primary Examiner*—Christopher McCarthy
(74) *Attorney, Agent, or Firm*—Kunzler & McKenzie (57) ABSTRACT

An apparatus, system, and method are disclosed for automatically backing up a dynamically created resource group. One embodiment of the apparatus includes an event module, a resource group module, and a backup module. The event module receives an event notification of an unanticipated system event, such as a system failure or similar event. The resource group module dynamically creates a resource group made up of resources (files, directories, applications, databases, etc.) in response to the event notification. The resource group may be created based on which resources are within a specified classification and have a timestamp within a specified time range. The backup module initiates a backup operation to copy the resource group to a backup location. The backup module backs up as much of the resource group as possible within the time between the resource group creation and the time that the system may become unavailable.

36 Claims, 6 Drawing Sheets

APPARATUS, SYSTEM, AND METHOD FOR RESOURCE GROUP BACKUP

BACKGROUND OF THE INVENTION

1. Field of the Invention

This invention relates to data storage and more particularly relates to dynamically creating a resource group and automatically backing up the resource group in response to an unanticipated failure event.

2. Description of the Related Art

Given the value of information in today's world, computers and network systems are specially designed to facilitate data backup operations. Some computers, such as personal computers, are designed to allow users to back up information in a fairly straightforward manner. For example, a user may set up a schedule of system backups and select which files should be backed up each time the backup operation is performed.

This typically requires that the user specify the schedule, such as the date and time, as well as the specific files that will be backed up. It is very easy for a user to be either under-inclusive or over-inclusive in specifying which files should be backed up. On a large network system, such as a local area network (LAN) or a wide area network (WAN), it becomes even more difficult, if not impossible, to manually specify all of the files and data structures that need to be backed up on various occasions.

Conventional backup systems also fail to tailor specific backup operations to certain types of events that may occur. For example, if a hard disk drive fails, the backup data needed to recover from such failure is different that the data needed to recover from a critical system error that affects user or application profiles.

In an effort to more efficiently back up files on a system, several solutions have been proposed. One solution incrementally backs up partitions on a storage device, such as a hard disk drive, which allows individual partitions to be backed up and retrieved. Another proposed solution is specifically directed toward backing up critical data files on a periodic basis. In this way, fairly recent versions of critical files may be recovered after a failure event of some kind. However, a user must specify beforehand which files are considered critical and how often those files should be backed up.

Other proposed solutions require maintenance of a central repository of files that belong to certain commercial software programs. By keeping a list or database of files that belong to an application program, a backup operation may potentially know which files to back up in response to a backup request. However, this solution requires that a software developer designate which application files should be included in a central repository, if available, and that a system administrator maintain the central repository. Reliance on the programmer and administrator, or other users, is subject to error, oversight, and inaccuracy.

In a related art, some solutions propose to restore backup data in response to a failure event. However, this data recovery operation, as well as other data recovery operations, requires that the data must first be backed up. As described above, data backup operations are currently dependent on manual scheduling and file selection by a user and, therefore, are subject to error.

Unfortunately, the proposed solutions fail to facilitate a backup process that operates according to policies which would allow a backup operation to be automatically invoked at any time and without user intervention. This failure is unacceptable in today's computing environment in which the complexity of computer systems gives rise to various unscheduled events, including system failures, hardware failures, data glitches, and so forth. By relying on manual selection of the files that should be backed up, without knowing what type of unscheduled event may occur, the specified files may be useless or less important than other files that might have been backed up under the circumstances of the unscheduled event.

In other words, it may be important to back up different files depending on what type of unscheduled event might occur. By designating the backup files without regard for the various unscheduled events that might occur, the proposed prior art solutions fail to account for the importance of individual files under various system circumstances.

From the foregoing discussion, it should be apparent that a need exists for an apparatus, system, and method that automatically back up a dynamically created resource group in response to an unscheduled system event. Beneficially, such an apparatus, system, and method would overcome the failure of the prior art to dynamically create a resource group that is complimentary to the type of unscheduled system event that occurs. The apparatus, system, and method would also be beneficial if able to overcome the conventional reliance on a scheduled backup that may or may not contain the most recent version of the data.

SUMMARY OF THE INVENTION

The present invention has been developed in response to the present state of the art, and in particular, in response to the problems and needs in the art that have not yet been fully solved by currently available data backup systems. Accordingly, the present invention has been developed to provide an apparatus, system, and method for automatically backing up a dynamically created resource group that overcome many or all of the above-discussed shortcomings in the art.

The apparatus to automatically back up a dynamically created resource group is provided with a logic unit containing a plurality of modules configured to functionally execute the necessary steps of automatically backing up a dynamically created resource group. As used herein, the term "resource" refers generally to one or more of the following: data files, media files, executable files, database entries, file directories, programming objects, logical applications, or any other identifiable data structure or unit. In one embodiment, these modules include an event module, a resource group module, and a backup module.

The event module receives an event notification of an unanticipated system event, such as a system failure or similar event. The resource group module dynamically creates a resource group made up of resources in response to the event notification. In certain embodiments, the resource may be referred to as system resources. All references herein to "system resources," and the like, are intended to refer to resources, generally. The resource group may be created based on which system resources are within a specified classification and have a timestamp within a specified time range. The backup module initiates a backup operation to copy the resource group to a backup location. The backup module backs up as much of the resource group as possible within the time between the creation of a resource group and the time that the system may become unavailable.

In certain embodiments, the resource group module may include an addition module, a removal module, a comparison module, and a priority group module. The addition module adds certain system resources to the resource group and the removal module may remove certain system resources from the resource group.

The comparison module, in one embodiment, is configured to compare a system resource and its attributes to one or more policies stored by the policy module. The comparison module may be employed by the addition module to determine if a candidate resource has attributes consistent with one or more system policies. For example, the comparison module may determine if a system resource is of a particular resource class, which may be defined by a classification policy based on a specified file type or another resource attribute. Additionally, the comparison module may determine if a system resource has a timestamp (i.e. creation timestamp, modification timestamp, etc.) within a time range specified by a time policy.

The priority group module consults a priority policy to determine if a priority group should be created. The priority policy may specify which types of system resources should belong to a priority resource group. The priority policy also may identify which types of priority resource groups should be created depending on the type of system event for which an event notification is received. In this way, the priority group module and the priority policy, along with a priority backup module, may facilitate backing up critical resources prior to backing up other non-critical resources, according to the system event that occurs.

A system of the present invention is also presented to automatically back up a dynamically created resource group. The system may be embodied personal computer, a workstation, a network server, a personal computing device (such as a personal digital assistant (PDA)), and any other type of computing device in which data backup may be required or desired. In particular, the system, in one embodiment, includes a resource management apparatus, as described above, as well as an electronic storage device, a client interface, and a central processing unit (CPU). The system may further include an electronic memory device, a network adapter, and other components that are typical within a computing device.

A method of the present invention is also presented for automatically backing up a dynamically created resource group. The method in the disclosed embodiments substantially includes the steps necessary to carry out the functions presented above with respect to the operation of the described apparatus and system. In one embodiment, the method includes receiving an event notification of an unanticipated system event, creating a resource group of system resources in response to the event notification, and initiating a backup operation to copy the resource group to a backup location. Given adequate time after receiving the event notification, all or part of the backup operation may be completed before the system potentially becomes unavailable due to the unanticipated system event.

In further embodiments, the method also may include qualifying the unanticipated system event as a priority system event according to a priority policy, creating a priority resource group according to a priority policy, selecting the priority policy from one of a plurality of priority policies in response to a determination of an event classification dependent on the event notification, and backing up the priority resource group prior to backing up a non-priority resource group. Additionally, the method may include comparing a time stamp of a resource candidate with a time range defined by a time policy, sorting a plurality of the resource candidates prior to comparison of a time stamp of one of the plurality of resource candidates with a time range, adding the resource candidate to the resource group in response to a determination that a time stamp of the resource candidate is within a time range defined by a time policy, and so forth.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
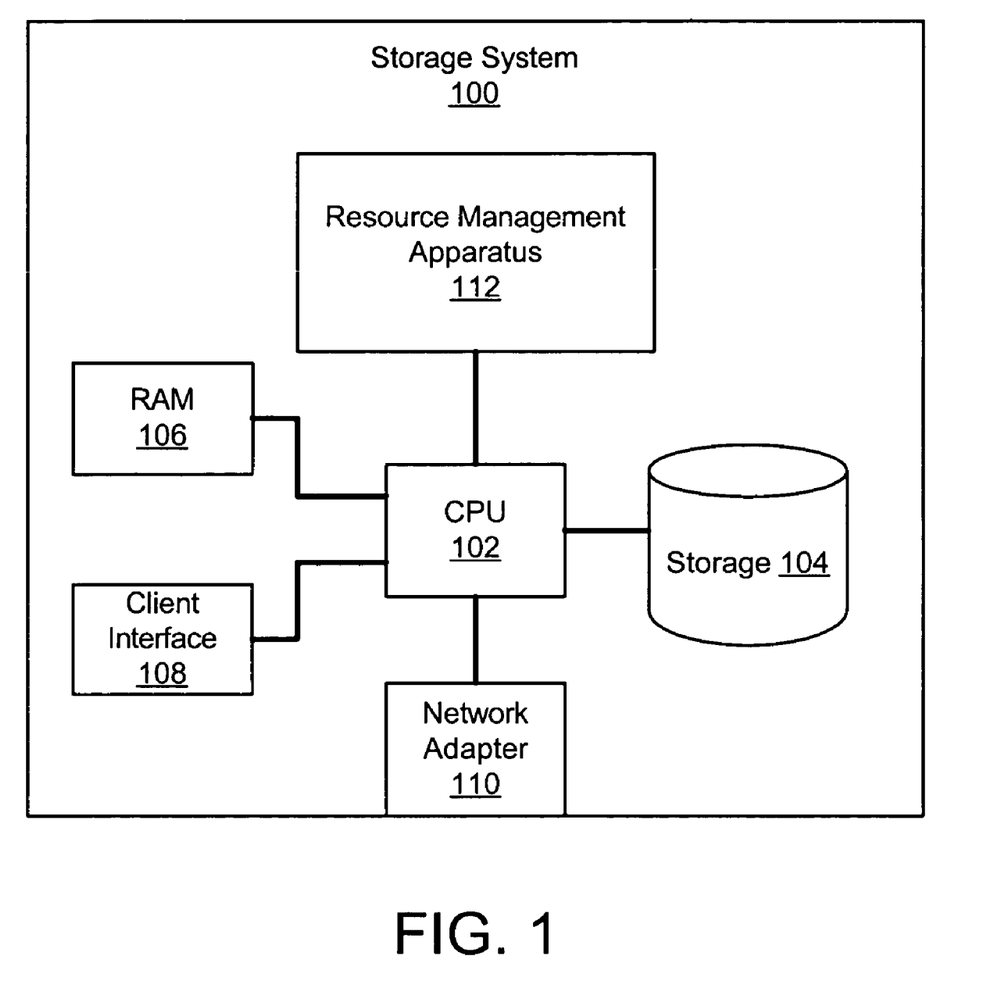
FIG. 1 is a schematic block diagram illustrating one embodiment of a storage system in accordance with the present invention.

FIG. 1 depicts one embodiment of a storage system 100 in which the present invention may be implemented. In particular, the illustrated storage system 100 includes a central processing unit (CPU) 102, an electronic storage device 104, an electronic memory device 106, a client interface 108, a network adapter 110, and a resource management apparatus 112. In certain embodiments, the storage system 100 may embody a personal computer, a networked workstation, a laptop computer, a personal computing device, and so forth. In further embodiments, the storage system 100 may be incorporated into or distributed within a local area network (LAN), a wide area network (WAN), a storage area network (SAN), or a similar type of computing environment.

The CPU 102 is configured, in one embodiment, to process data requests, operations, and commands that are employed on or in conjunction with the storage system 100.

The electronic storage device 104 is configured, in one embodiment, to electronically store data that is related to the management and operation of the storage system 100. The electronic storage device 104 may comprise one or more storage media, including direct access storage devices (DASDs), optical devices, tape drives, and so forth.

The electronic memory device 106 is configured to store control instructions and data related to the performance of logical applications or programs on the storage system 100. The client interface 108, in one embodiment, allows a user person or program to interface with the storage system 100. For example, a network administrator may input data into the storage system 100 that may be processed by the CPU 102, stored on the electronic storage device 104, used by the resource management apparatus 112, and so forth. The network adapter 110 allows the storage system 100 to communicate with other computing devices over a network (not shown), including a LAN, WAN, SAN, Wi-Fi, or other similar networks of various topologies.

The resource management apparatus 112 is configured, in one embodiment, to identify a failure on the storage system 100, dynamically create a resource group, and back up the resource group as much as possible before the storage system 100 becomes unavailable due to the identified failure. A failure that may be identified by the resource management apparatus may include a hardware failure, a software or firmware failure, a power supply failure, or any other type of failure that is detectable on the storage system 100.

The resource group may be created using one or more policies. The present description discusses time, classification, and priority policies, in particular. However, other embodiments of the invention may employ fewer or more policies to create and describe a resource group. By way of example, a resource group may comprise all files of a specified classification, i.e. movie files, that have a timestamp within a given time range. Resource classifications may be defined broadly to include large quantities of loosely related resources, in one embodiment, or may be narrowly defined so as to limit the size of a potential resource group. Although resource classifications may be pre-defined or user-definable, some possible classifications include, music files, graphic files, database files, program files, files within a given directory, file system, or volume, and so forth.

Figure 2:
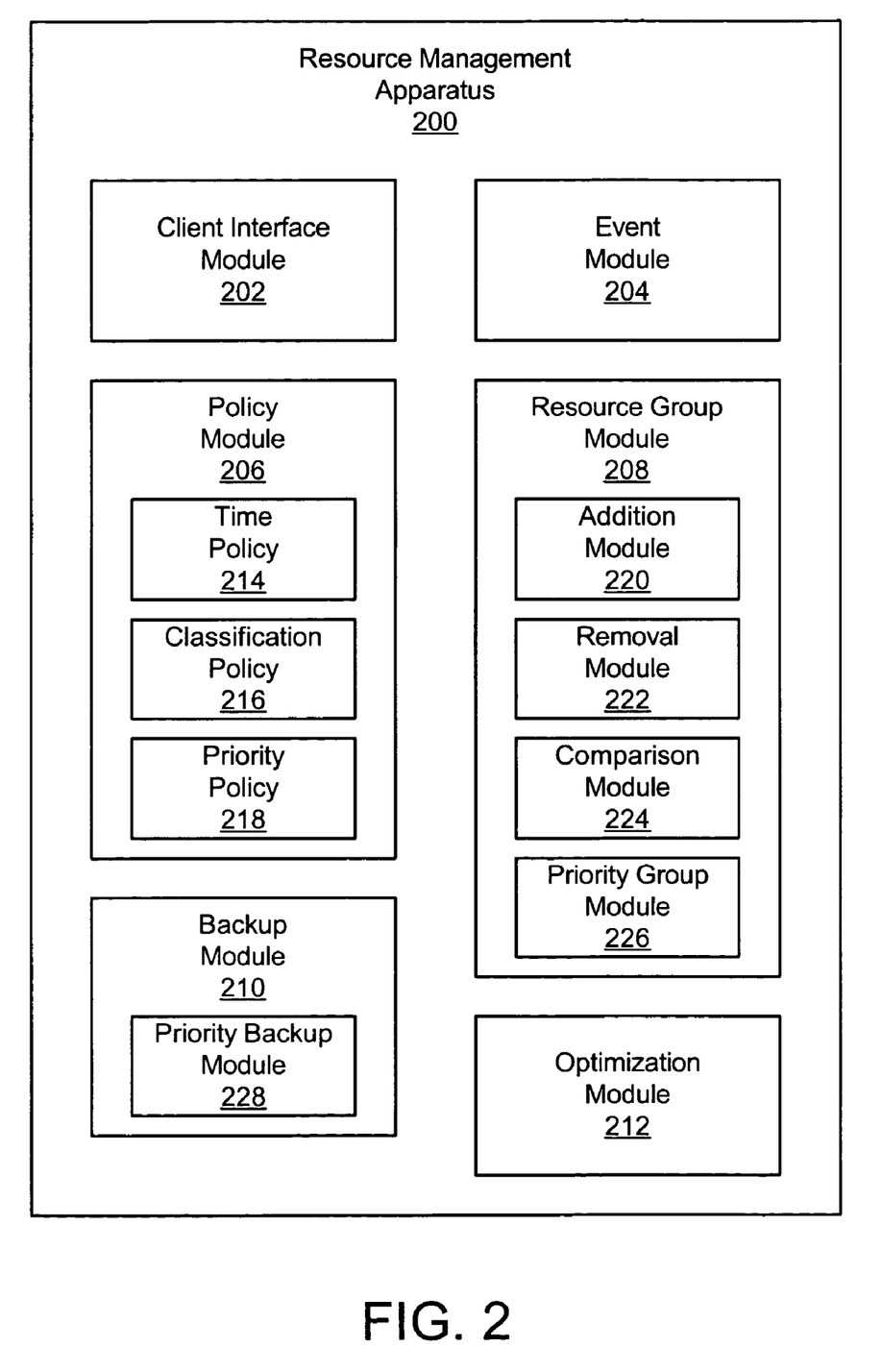
FIG. 2 is a schematic block diagram illustrating one embodiment of a resource management apparatus in accordance with the present invention.

FIG. 2 depicts one embodiment of a resource management apparatus 200 that is substantially similar to the resource management apparatus 112 of the storage system 100 shown in FIG. 1. The illustrated resource management apparatus 200 includes a client interface module 202, an event module 204, a policy module 206, a resource group module 208, a backup module 210, and an optimization module 212.

In one embodiment, the client interface module 202 allows a client, such as a user or an application client, to interface with the resource management apparatus 200. For example, a user may input certain policies that may be used by the policy module 206. Additionally, a user may input the source and target locations of the storage devices that may be used to back up data. In a further embodiment, the client interface module 202 also may be used to present the status of the entire resource management apparatus 200 and its modules. In a still further embodiment, a user may employ the client interface module 202 to input and manually trigger a backup operation.

The event module 204, in one embodiment, may be configured to recognize and identify an event notification, such as a failure notification. Many event notifications are well known in the art and are distinguishable in that each event notification may identify a specific problem within the storage system 100. The event module 204 may recognize the presence of an event notification and identify the type of failure or other event that corresponds to the recognized notification signal.

The policy module 206 is configured, in one embodiment, to store one or more system policies. In the illustrated embodiment, the policy module 206 stores a time policy 214, a classification policy 216, and a priority policy 218. The policy module 206 may store additional policies that pertain to the operation of the resource management apparatus 200. The system policies 214-218 may be stored on the electronic storage device 104, the electronic memory device 106, or another storage or memory device in the storage system 100 or a connected network device.

The time policy 214 is descriptive of one or more time ranges. In one embodiment, each time range may correspond to a particular resource classification. For example, one time range may be associated with user data files and another time range may correspond to system files. Additionally, different time ranges may correspond to different types of system events. In an alternate embodiment, the time policy 214 may define a single time range applicable to all resource classifications and all system event types.

The classification policy 216 is descriptive of one or more resource classifications. As described above, a resource classification is a definition that may be used to collect system resource having a common or similar resource attribute. For example, a resource classification may specify a file type, a file size, a file owner or user, or any other resource attribute. In a further embodiment, a resource classification may define a resource class based on a combination of resource attributes, which attributes may be given equal or unequal weight within a particular classification. For example, a resource classification may define a resource class that includes all directories, created by a particular application program, that contain files within a specified range of size.

The priority policy 218 is descriptive of one or more priority schemes. Each priority scheme may correspond to a particular type of system event. For example, the priority policy 218 may define a priority scheme in which certain resources are specified to form a first resource group and other resources are specified to form a second resource group. In this way, the first resource group may be created (by the resource group module 208) and backed up (by the backup module 210) before the second resource group is even formed. By phasing the creation and backup as described, certain resources of high priority may be backed up before resources of a lower priority. Such phasing can be especially advantageous when a failure event occurs and there is very little time to perform backup operations before the storage system 100 is expected to be unavailable. Other priority schemes based on network availability, concurrent system use, and other environmental factors also may be defined and stored by the policy module 206.

The resource group module 208 is configured to create a resource group according to one or more of the system policies 214-218. In the depicted embodiment, the resource group module 208 includes an addition module 220, a removal module 222, a comparison module 224, and a priority group module 226.

The additional module 220 is configured to add a resource to a resource group that is pre-existing or that is currently being created. Correspondingly, the removal module 222 allows a resource that has already been added to a resource group to be removed from the resource group. The comparison 224 module is configured, in one embodiment, to compare a candidate resource to one or more of the system policies 214-218 to determine if the candidate resource should be added to or removed from the resource group. The priority group module 226 is configured to create a priority resource group according to one or more of the priority policies 218. If a priority policy 218 does not necessitate that a priority resource group be established, the resource group module 208 may simply create one or more default resource groups according to a default policy (not shown).

The backup module 210 is configured, in one embodiment, to back up the resource groups created by the resource group module 208. In another embodiment, the backup module 210 only initiates the backup operations, which may or may not be completed depending on the duration of availability of the storage system 100 after the system event and event notification. In addition, the backup module 210 may track the source and target locations of the backup data.

In one embodiment, the backup module 210 includes a priority backup module 228. The priority backup module 228 may be configured to back up one or more priority resource groups according to a priority policy 218.

The optimization module 212 is configured to optimize, such as by increasing the efficiency and speed, the resource group creation and backup operations. In one embodiment, the optimization module 212 may pre-select or pre-sort candidate resource that may be used to create a resource group. In a further embodiment, the optimization module 212 may implement one or more optimization schemes according to an optimization policy (not shown), which may be dependent on the event type or another operational parameter.

The following schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
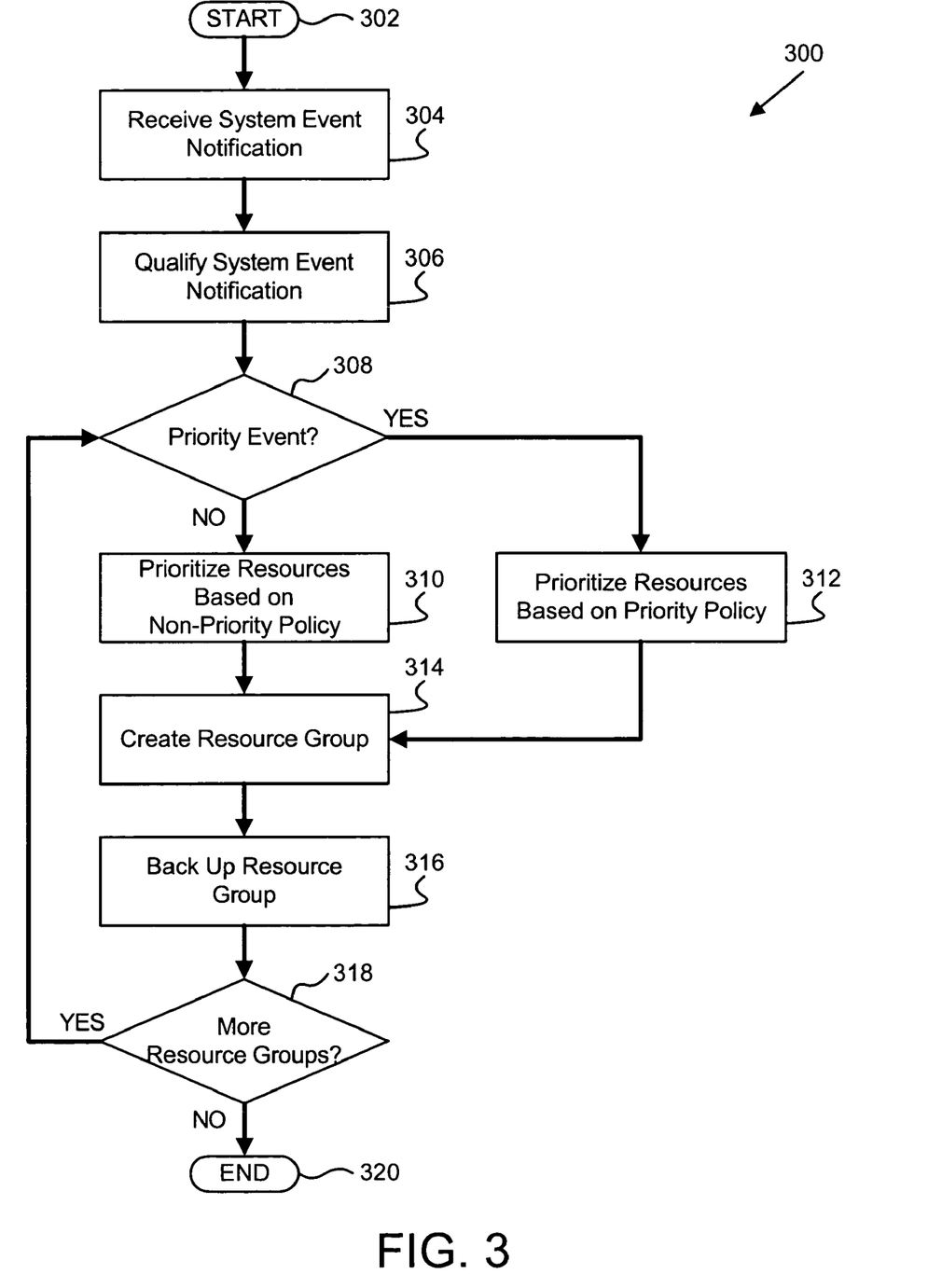
FIG. 3 is a schematic flow chart diagram illustrating one embodiment of a backup method in accordance with the present invention.

FIG. 3 depicts one embodiment of a backup method 300 that may be employed by the resource management apparatus 200 to create and back up a resource group in response to an unanticipated system event. The illustrated backup method 300 begins 302 when the event module 204 receives 304 and qualifies 306 a system event notification. In one embodiment, the event module 304 may qualify 306 the system event notification by identifying the system event notification with a notification policy (not shown). The notification policy may correlate typical system event notifications and event types to corresponding system policies, including time policies 214, classification policies 216, and priority policies 218.

It is possible that some system event notifications, once qualified 306, may be disregarded according to the notification policy. For example, if a notification policy states that a failure at the network adapter 110 may be disregarded, the resource management apparatus 200 may elect to disregard the notification and do nothing further. In other embodiments, the qualified 306 system event notification may initiate further processes as discussed below.

In one embodiment, the event module 204 may determine 308, according to a priority policy 218 if the system event notification corresponds to a designated priority event. If the system event is determined 308 to be a non-priority event, the resource group module 208 may identify a corresponding non-priority policy (or a default policy) that may be used prioritize 310 the system resources. In one embodiment, using a non-priority policy may require little or no prioritizing 310 of the system resources.

Alternately, the resource group module 208 may identify a priority event, corresponding to a priority policy 218, and prioritize 312 the system resources according to the priority policy 218. As described above, the priority policy 312 may depend on the type of system event notification received 304. After prioritizing 310, 312 the system resources according to a non-priority policy or priority policy 218, the resource group module 208 creates 314 the specified resource group. The backup module 210, in the depicted embodiment, then backs up 316 the resource group. Backing up 316 the resource group is described in more detail with reference to FIG. 4.

After backing up 316 a resource group, the resource group module 208 may determine 318 if additional resource groups should be created 314, assuming the storage system 100 is still available. As long as the storage system 100 is available and additional resource groups need to be created 314 and backed up 316, the resource management apparatus 200 may iteratively return to execute the processes described above. For example, the resource group module 208 may continue to create 314 resource groups according to the system policies 214-218 until all of the specified resource groups have been created 314.

In a further embodiment, depending on the system policies 214-218, the backup method 300 may be modified to first create 314 all of the specified resource groups before backing up 316 any of the created 314 resource groups. Still further, the backup method 300 may be modified so that small portions of individual resource groups are iteratively created 314 and backed up 316 to increase the probability that at least some of the resources may be backed up 316 before the storage system 200 potentially becomes unavailable.

Figure 4:
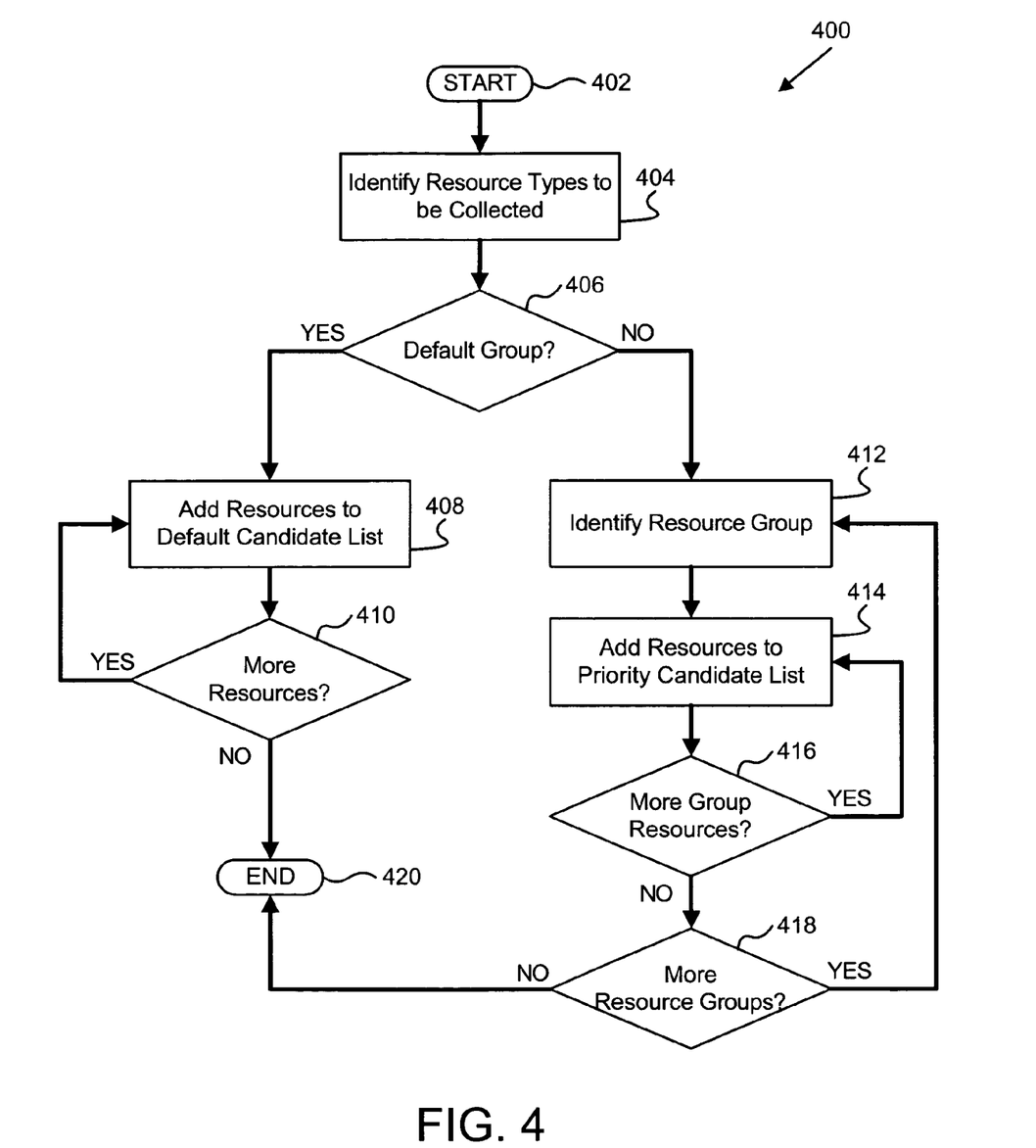
FIG. 4 is a schematic flow chart diagram illustrating one embodiment of a classification method in accordance with the present invention.

FIG. 4 depicts one embodiment of a classification method 400 that is given by way of example of the resource group creation process 314 of the backup method 300 of FIG. 3. The illustrated classification method 400 begins 402 by identifying 404 the resource types that should be collected according to a classification policy 216. The resource group module 208 subsequently determines 406 if a default resource group should be created 314, for example, due to the absence of a priority policy 218.

In the illustrated embodiment, system resources are added 408 to a default candidate list based on which system resources are compatible with the corresponding classification policy 216. System resources are added 408 until the resource group module 208 determines 410 that all of the potential candidate resources have been added 408, based on resource classification, to the default candidate list.

Alternately, the resource group module 208 identifies 412 a resource group to be created 314 in accordance with a priority policy 218. For each resource group specified, the priority group module 226 may add 414 system resources to a priority candidate list based on which system resources are compatible with the corresponding classification policy 216. The priority group module 226 continues to add 414 candidate resources until the resource group module 208 determines 416 that all of the potential candidate resources for that resource class have been added 414. Adding 408, 414 candidate resources to a candidate list (either default or priority) is described in more detail with reference to FIG. 5.

The resource group module 208 subsequently may determine 418 if additional resource groups should be created according to the priority policy 218. If so, the resource group module returns to identify 412 the next resource group and repeat the processes described above. Once all of the non-priority or priority resource groups have been created, the depicted classification method 400 then ends 420.

Figure 5:
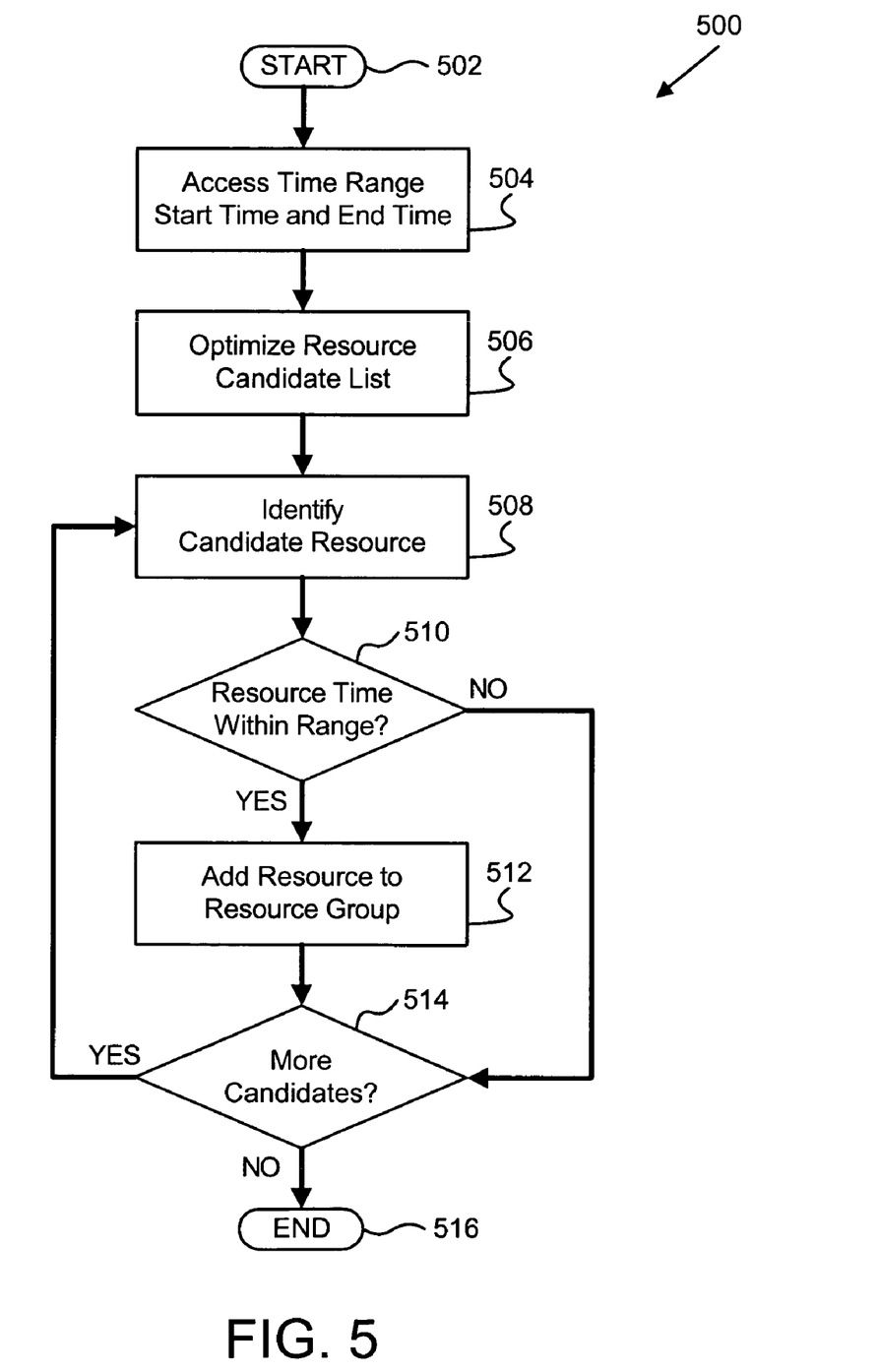
FIG. 5 is a schematic flow chart diagram illustrating one embodiment of a creation method in accordance with the present invention.

FIG. 5 depicts one embodiment of a creation method 500 that is given by way of example of an addition processes 408, 414 of the classification method 400 of FIG. 4. The illustrated creation method 500 begins 502 by accessing 504 the time policy 214 to determine a time range applicable to the resource class being created 314. The resource group module 208 may then invoke the optimization module 212 to preliminarily optimize 506 the candidate list so that it may be traversed in an efficient manner. For example, the optimization module 212 may sort the candidate list according to a timestamp of each of the candidate resources. In one embodiment, the optimization module 212 may sort the candidate resources from most recent timestamp to least recent timestamp. One example of optimizing 506 the resource candidate list is described in more detail with reference to FIG. 6.

After optimizing 506 the candidate list, the resource group module 208 identifies 508 one of the candidate resources in the candidate list and, for each candidate resource, determines 510 if the timestamp of the identified candidate resource is within a corresponding time range specified in the time policy 214. In one embodiment, the resource group module 208 employs the comparison module 224 to compare the timestamp to the time range.

If the candidate resource has a timestamp within the specified time range, the candidate resource is added 512 to the resource group. In one embodiment, the resource group module 208 employs the addition module 220 to add 512 the candidate resource to the resource group. After adding 512 the candidate resource to the resource group or determining 510 that the timestamp is not within the given time range, the resource group module 208 determines 514 if additional candidate resources are in the candidate list. If so, the resource group module 208 returns to identify 508 the next candidate resource in the candidate list and repeat the processes described above.

Alternately, if the candidate list has been optimized 506, the resource group module 208 may determine 514 that all of the remaining candidate resources are outside the time range specified in the time policy 214. After traversing the entire candidate list or a sufficient portion of an optimized 506 candidate list, the depicted creation method 500 then ends 516.

Figure 6:
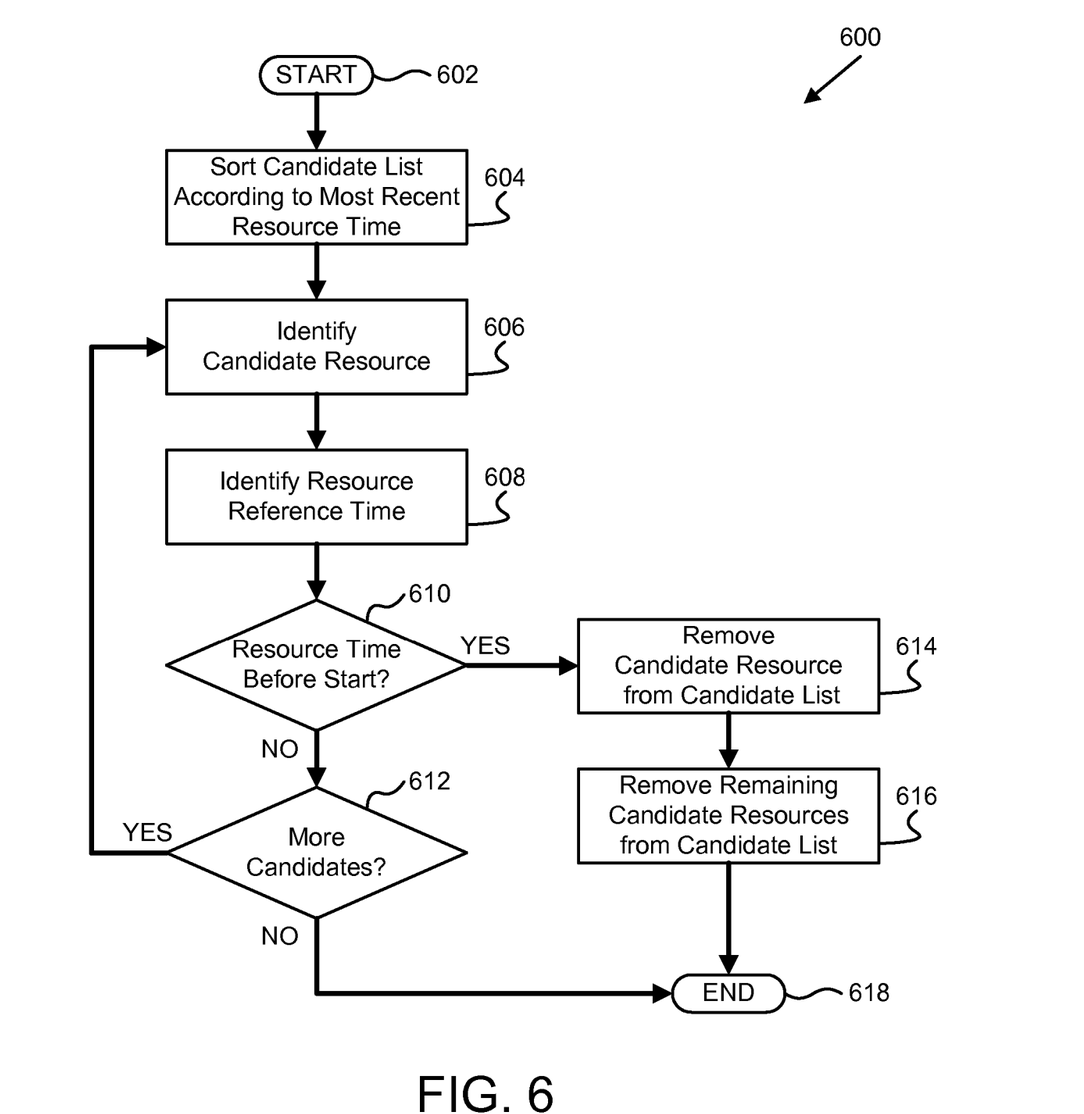
FIG. 6 is a schematic flow chart diagram illustrating one embodiment of an optimization method in accordance with the present invention.

FIG. 6 depicts one embodiment of an optimization method 600 that is given by way of example of the candidate list optimization process 506 of the creation method 500 of FIG. 5. In one embodiment, the optimization method 600 is performed, at least in part, by the optimization module 212 of the resource group module 208. In general, the optimization method 600 allows pre-sorting of the resource candidate list so that the resource group may be created more quickly and efficiently, which is advantageous within the constraints of a system failure or similar event.

The optimization method 600, in one embodiment, begins 602 by sorting 604 the resource candidate list according to a resource timestamp. For example, the optimization module 212 may sort 604 the candidate resources according to a creation timestamp. Alternately, the optimization module 212 may sort 604 the candidate resources according to a last access or other timestamp. Once the candidate list is sorted 604, the optimization module 212 identifies 606 one of the candidate resources and identifies 608 the corresponding resource reference time.

If the candidate list is sorted 604 from most recent to least recent, in one embodiment, the optimization module then compares the resource reference time to the start time of the time range. If the optimization module 212 determines 610 that the resource reference time is not before the start time (i.e. the candidate resource was created prior to the start time of the time range), the optimization module may take no action with regard to that candidate resource, determines 612 if additional candidate resources are in the candidate list, and, if so, returns to identify 606 the next candidate resource.

Otherwise, the optimization module 212 removes 614 the candidate resource from the candidate list and removes 616 the remaining candidate resources from the candidate list, since they will also have reference times prior to the start time. In one embodiment, the resource group module 208 employs the removal module 222 to remove 614 the candidate resource to the resource group.

In this way, the optimization method 600 may traverse the sorted 604 candidate list and quickly remove all candidate resources whose reference times are outside of the time range, at least on one side of the time range. In the depicted embodiment, by sorting 604 by most recent timestamp and removing 614 the first candidate resource with a reference time prior to the start time, all of the remaining candidate resources with earlier start times may be summarily removed 616 from the candidate list, also.

In a further embodiment, the optimization method 600 may be modified to perform an inverse sorting and remove candidate resource that have reference times later than the end time of the time range. Still further, the optimization method 600 may be modified to perform multiple comparisons to limit the list to an even smaller pool of candidate resources. After traversing the resource candidate list and removing 614, 616 certain candidate resources, as described, the depicted optimization method 600 then ends 618.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising executable modules stored on computer readable media, the apparatus to automatically back up a dynamically created resource group, the apparatus comprising:
    an event module configured to receive an event notification of an unanticipated system event;
    a resource group module configured to create at least one resource group of resources according to a policy in response to the event notification; and
    a backup module configured to initiate a backup operation to copy the at least one resource group to a backup location in order according to the policy, the backup operation in response to the event notification.

2. The apparatus of claim 1, wherein the policy comprises a priority policy and the resource group module comprises a priority group module configured to create a priority resource group according to the priority policy.

3. The apparatus of claim 2, wherein the backup module comprises a priority backup module configured to back up the priority resource group prior to backing up a non-priority resource group.

4. The apparatus of claim 1, wherein the policy comprises a priority policy and the resource group module creates at least one resource group and the backup module initiates a backup operation in response to the event module qualifying the unanticipated system event as a priority system event according to the priority policy.

5. The apparatus of claim 1, wherein the policy comprises a time policy and the resource group module comprises a comparison module configured to compare a time stamp of a resource candidate with a time range defined by the time policy.

6. The apparatus of claim 5, wherein the resource group module further comprises an addition module configured to add the resource candidate to the resource group in response to a determination that the time stamp of the resource candidate is within the time range defined by the time policy.

7. The apparatus of claim 5, further comprising an optimization module configured to sort a plurality of the resource candidates prior to comparison of the time stamp of one of the plurality of resource candidates with the time range and prior to the unanticipated system event.

8. The apparatus of claim 1, further comprising a policy module configured to store a time policy descriptive of a time range, the time range having a start time and an end time, wherein the policy comprises the time policy and the resource group module creates a resource group of resources, each resource with a timestamp complying with the time policy.

9. The apparatus of claim 1, further comprising a policy module configured to store a classification policy descriptive of a resource class, the resource class defined by a common resource attribute, wherein the policy comprises the classification policy and the resource group module creates a resource group of resources each with a common resource attribute complying with the classification policy.

10. The apparatus of claim 1, further comprising a policy module configured to store a priority policy descriptive of a prioritization sequence for a plurality of resource classes, wherein the policy comprises the priority policy and a priority group module creates a priority resource group according to the priority policy, and a priority backup module backs up the priority resource group prior to backing up a non-priority resource group.

11. The apparatus of claim 10, wherein the policy module is further configured to select the priority policy from one of a plurality of priority policies in response to a determination of an event classification dependent on the event notification.

12. The apparatus of claim 1, further comprising a client interface module configured to receive a client time input, the client time input defining a time policy, wherein the policy comprises the time policy.

13. The apparatus of claim 12, wherein the client interface module is further configured to receive a client classification input, the client classification input defining a classification policy, wherein the policy further comprises the classification policy.

14. The apparatus of claim 1, wherein the resources within the resource group comprise at least one resource selected from a data file, an executable file, and a file directory.

15. The apparatus of claim 1, wherein the resources within the resource group comprise at least one resource selected from a database entry, a programming object, and a logical application.

16. A system to automatically back up a dynamically created resource group, the system comprising:
  an electronic storage device configured to store one or more policies;
  a client interface configured to receive the time policy from a client;
  an event module configured to receive an event notification of an unanticipated system event;
  a policy module configured to store a priority policy, a time policy, and a classification policy, the priority policy selected from one of a plurality of priority policies in response to a determination of an event classification dependent on the event notification, the time policy defining a time range, the classification policy defining a resource class;
  a resource group module configured to create at least one resource group of resources in response to the event notification, the at least one resource group created according to one or more policies stored by the policy module; and
  a backup module configured to initiate a backup operation to copy the at least one resource group to a backup location in response to the event notification, the at least one resource group copied in an order according to the one or more policies.

17. The system of claim 16, further comprising a priority group module configured to designate at least one resource group as a priority resource group according to the priority policy.

18. The system of claim 17, further comprising priority backup module configured to back up the at least one priority resource group prior to backing up a non-priority resource group.

19. A signal bearing medium tangibly embodying a program of machine-readable instructions executable by a digital processing apparatus to perform operations to automatically back up a dynamically created resource group, the operations comprising:
  receiving an event notification of an unanticipated system event;
  creating at least one resource group of resources according to a policy in response to the event notification; and
  initiating a backup operation to copy the at least one resource group to a backup location in order according to the policy, the backup operation in response to the event notification.

20. The signal bearing medium of claim 19, wherein the policy comprises a priority policy and the instructions further comprise operations to create a priority resource group according to the priority policy.

21. The signal bearing medium of claim 19, wherein the instructions further comprise operations to back up a priority resource group prior to backing up a non-priority resource group.

22. The signal bearing medium of claim 19, wherein the policy comprises a priority policy and wherein creating at least one resource group and initiating a backup operation is in response to qualifying the unanticipated system event as a priority system event according to the priority policy.

23. The signal bearing medium of claim 19, wherein the policy comprises a time policy and the instructions further comprise operations to compare a time stamp of a resource candidate with a time range defined by the time policy.

24. The signal bearing medium of claim 23, wherein the instructions further comprise operations to add the resource candidate to the resource group in response to a determination that a time stamp of the resource candidate is within a time range defined by a time policy.

25. The signal bearing medium of claim 23, wherein the instructions further comprise operations to sort a plurality of the resource candidates prior to comparison of a time stamp of one of the plurality of resource candidates with a time range.

26. The signal bearing medium of claim 19, wherein the instructions further comprise operations to store a time policy descriptive of a time range, the time range having a start time and an end time, wherein the policy comprises the time policy and creating at least one resource group further comprises creating a resource group of resources, each resource with a timestamp complying with the time policy.

27. The signal bearing medium of claim 19, wherein the instructions further comprise operations to store a classification policy descriptive of a resource class, the resource class defined by a common resource attribute, wherein the policy comprises the classification policy and creating at least one resource group further comprises creating a resource group of resources each with a common resource attribute complying with the classification policy.

28. The signal bearing medium of claim 19, wherein the instructions further comprise operations to store a priority policy descriptive of a prioritization sequence for a plurality of resource classes, wherein the policy comprises the priority policy and the instructions further comprise creating a priority resource group according to the priority policy and backing up the priority resource group prior to backing up a non-priority resource group.

29. The signal bearing medium of claim 28, wherein the instructions further comprise operations to select the priority policy from one of a plurality of priority policies in response to a determination of an event classification dependent on the event notification.

30. The signal bearing medium of claim 19, wherein the instructions further comprise operations to receive a client time input, the client time input defining a time policy, wherein the policy comprises the time policy.

31. The signal bearing medium of claim 19, wherein the instructions further comprise operations to receive a client classification input, the client classification input defining a classification policy, wherein the policy further comprises the classification policy.

32. The signal bearing medium of claim 19, wherein the resources within the resource group comprise at least one resource selected from a data file, an executable file, and a file directory.

33. The signal bearing medium of claim 19, wherein the resources within the resource group comprise at least one resource selected from a database entry, a programming object, and a logical application.

34. A method for automatically backing up a dynamically created resource group, the method comprising:
  receiving an event notification of an unanticipated system event;
  creating at least one resource group of resources according to a policy in response to the event notification; and initiating a backup operation to copy the at least one resource group to a backup location in order according to the policy, the backup operation in response to the event notification.

35. A method for automatically backing up a dynamically created resource group, the method comprising:
   receiving an event notification of an unanticipated system event;
   determining if the unanticipated system event is a priority system event according to a priority policy;
   storing a time policy descriptive of a time range, the time range having a start time and an end time;
   comparing a time stamp of one of the plurality of resource candidates with the time range to determine if a timestamp of the resource candidate is within the time range, the plurality of resource candidates having been sorted prior to the comparison;
   creating a priority resource group of at least some of the resources candidates determined to have a timestamp in the time range in response to the event notification comprising a priority system event; and
   initiating a backup operation to back up the priority resource group to a backup location prior to backing up a resource not within a priority resource group, the backup operation in response to the event notification comprising a priority system event.

36. An apparatus to automatically back up a dynamically created resource group, the apparatus comprising:
   means for receiving an event notification of an unanticipated system event;
   means for creating at least one resource group of resources according to a policy in response to the event notification; and
   means for initiating a backup operation to copy the at least one resource group to a backup location in order according to the policy, the backup operation in response to the event notification.

* * * * *